(12) United States Patent
Luksch et al.

(10) Patent No.: US 6,536,301 B1
(45) Date of Patent: Mar. 25, 2003

(54) GRAB HANDLE FOR VEHICLE INTERIORS

(75) Inventors: Uwe Luksch, Maulbronn (DE); Klaus Heidelberger, Sulzfeld (DE)

(73) Assignee: Utescheny AG, Zaisenhausen (DE)

( * ) Notice: Subject to any disclaimer, the term of this patent is extended or adjusted under 35 U.S.C. 154(b) by 0 days.

(21) Appl. No.: 09/717,795

(22) Filed: Nov. 21, 2000

(30) Foreign Application Priority Data

Nov. 26, 1999 (DE) .................................. 299 20 776 U

(51) Int. Cl.7 .............................. G05G 1/10; E05B 7/00
(52) U.S. Cl. ........................ 74/543; 16/429; 16/408; 403/349
(58) Field of Search ........................ 74/543; 296/71, 296/214; 403/315, 318, 316, 317; 16/408, 415, 429

(56) References Cited

U.S. PATENT DOCUMENTS

| 1,028,126 | A | * | 6/1912 | Meredith | ............. 403/72 |
| 2,672,103 | A | * | 3/1954 | Hohmes | ............. 105/34 |
| 4,376,397 | A | * | 3/1983 | Newby et al. | ............. 81/177.2 |
| 5,558,552 | A | * | 9/1996 | Namur | ............. 441/75 |
| 5,920,957 | A | * | 7/1999 | Wagner | ............. 16/112 |
| 6,003,202 | A | * | 12/1999 | Dauterive | ............. 16/115 |

FOREIGN PATENT DOCUMENTS

| DE | 9200913.1 | 6/1992 | ............. B60N/3/02 |
| DE | 9213972.8 | 1/1993 | ............. B60N/3/02 |

* cited by examiner

*Primary Examiner*—David A. Bucci
*Assistant Examiner*—Justin Stefanon
(74) *Attorney, Agent, or Firm*—Darby & Darby

(57) ABSTRACT

The present invention relates to a grab handle for vehicle interiors, having a u-shaped holding strap (10) which has a tubular, essentially rectilinear central part (12) and two bent end parts (14.1, 14.2) each having a twist and plug-in securing means, the twist and plug-in securing means being plugged from opposite end sides of the central part (12) into the central part (12) and being held there.

11 Claims, 5 Drawing Sheets

GRAB HANDLE FOR VEHICLE INTERIORS

TECHNICAL FIELD

The present invention relates to a grab handle for vehicle interiors, having a U-shaped holding strap which has a tubular, essentially rectilinear, central part and two bent end parts each having a twist and plug-in securing means, the twist and plug-in securing means being plugged from opposite end sides of the central part into the central part and being held there.

PRIOR ART

G 9200 913 U1 discloses a grab handle of this type, in which two diametrically opposite steps are incorporated into the inner wall of the central part and are used as a mating latch for two latching tongues which are present. During the latching process the end parts have to be pressed beyond their end position against one another, so that the latch can engage and holds the end parts in their final positions. For each latching tongue the elasticity required for this has to lie in the associated half of the central part. However, such a high longitudinal elasticity is disadvantageous for the subsequent desired tight fit of the three parts—two end parts and a central part—against one another.

G 92 13 972 U1 likewise discloses a grab handle of the generic type. In this grab handle the two latching tongues are designed as a latch and matching counterlatch. The required elasticity for snapping in the latch is thereby applied by the entire length of the central part with tolerance conditions otherwise being comparable. Therefore, only approximately half as great longitudinal elasticity is required as in the above-described prior art.

SUMMARY OF THE INVENTION

The present invention is based on the technical problem or object of specifying a grab handle for vehicle interiors which is of the type mentioned at the beginning, can be produced economically, makes simple assembly possible and ensures a permanently reliable connection of the end parts to the central part.

The grab handle according to the invention is specified by the features of independent claim 1. Advantageous refinements and developments are the subject matter of the dependent claims.

Accordingly, the grab handle according to the invention is distinguished in that the twist and plug-in securing means is designed as a projecting device which is formed integrally on the respective end part and whose cross section is designed in such a manner that the projecting device can be plugged into the interior of the central part (installation position) and a certain rotation with respect to the central part is possible about the longitudinal axis of said central part (end position), at least one first projecting unit is arranged on the outside of the projecting device, for each end part there is molded on the inner wall of the central park at least one groove which runs in the longitudinal direction and in which the first projecting unit engages during the plugging-in process of the end part, at least one second projecting unit projects in each case into the groove, in the plugged-in and twisted state of the end parts the first projecting unit of the projecting device gripping the second projecting unit of the groove from behind, and the gripping from behind in the case of the left end part being produced by clockwise rotation and in the case of the right end part being produced by counterclockwise rotation, or vice versa.

In view of the production of the components as injection-molded plastic parts, it is possible with the grab handle according to the invention to ensure economic viability for the production of mass-produced components. The assembly is made particularly simple, since the end parts merely have to be plugged into the central part in a predetermined installation position, and after that a certain, relatively small rotation of the end parts relative to the central part is carried out, so that the parts latch together. Because the left and right end parts are latched using a different direction of rotation, a reliable and permanent connection is ensured, since when there is a clockwise or counterclockwise rotational effect acting on the central part, twisting is blocked by the respective projecting device of the left and, respectively, the right end parts. At the same time, the end parts are prevented from being pulled out of the central part by the first projecting units of the projecting device gripping the second projecting units of the groove from behind.

A particularly preferred refinement, which also ensures economic production, is distinguished in that the groove is designed as a continuous groove.

In order to increase the stability of the connection further, a particularly advantageous refinement is distinguished in that the first projecting unit and the second projecting unit are arranged in a predetermined, mutually coordinate grid on the projecting device and, respectively, in the groove. A particularly preferred development is distinguished in that first projecting units are arranged on opposite outer sides of the projecting device and two diametrically opposite grooves having second projecting units are correspondingly arranged in the inner wall of the central part.

With regard to economic production, it has proven particularly advantageous to produce the central part from two half shells which are connected to each other.

A particularly preferred refined of the grab handle according to the invention is distinguished in that the length of the projecting device of an end part corresponds to essentially half the length of the central part. This measure enables particularly great stiffness of the connecting structure to be realized. Going along the same lines is an advantageous development which is distinguished in that the cross section of the projecting device is formed as a solid cross section.

Further embodiments and advantages of the invention arise by way of the rest of the features mentioned in the claims and by way of the exemplary embodiment given below. The features of the claims may be combined with one another in any desired manner insofar as they are not obviously mutually exclusive.

BRIEF DESCRIPTION OF THE DRAWING

The invention and advantageous embodiments and developments thereof are described and explained in greater detail below with reference to the example illustrated in the drawing. According to the invention, the features which can be gathered from the description and the drawing can be used individually on their own or a number of them can be used in any desired combination. In the drawing.

WAYS OF IMPLEMENTING THE INVENTION

The holding strap 10 which is illustrated in the figures is part of a grab handle (not illustrated in greater detail) for vehicle interiors, said grab handle being mounted on the inner wall, in particular being mounted in a foldable manner, via bearing structures (not illustrated in greater detail).

The holding strap 10 consists of a central part 12 and a right bent end part 14.1 and a left bent end part 14.2, each plugged into the central part. All in all, in the fitted state, the two end parts 14.1, 14.2 and the central part 12 form a U-shaped holding strap.

The central part 12 consists of two half shells which are connected to each other, in particular are bonded or welded, and is provided with an essentially rectilinear profile having non-circular outer and inner cross sections. The end parts 14.1 and 14.2 are held in the central part 12 in a secure manner against twisting and being pulled out, which is described below.

Figure 1:
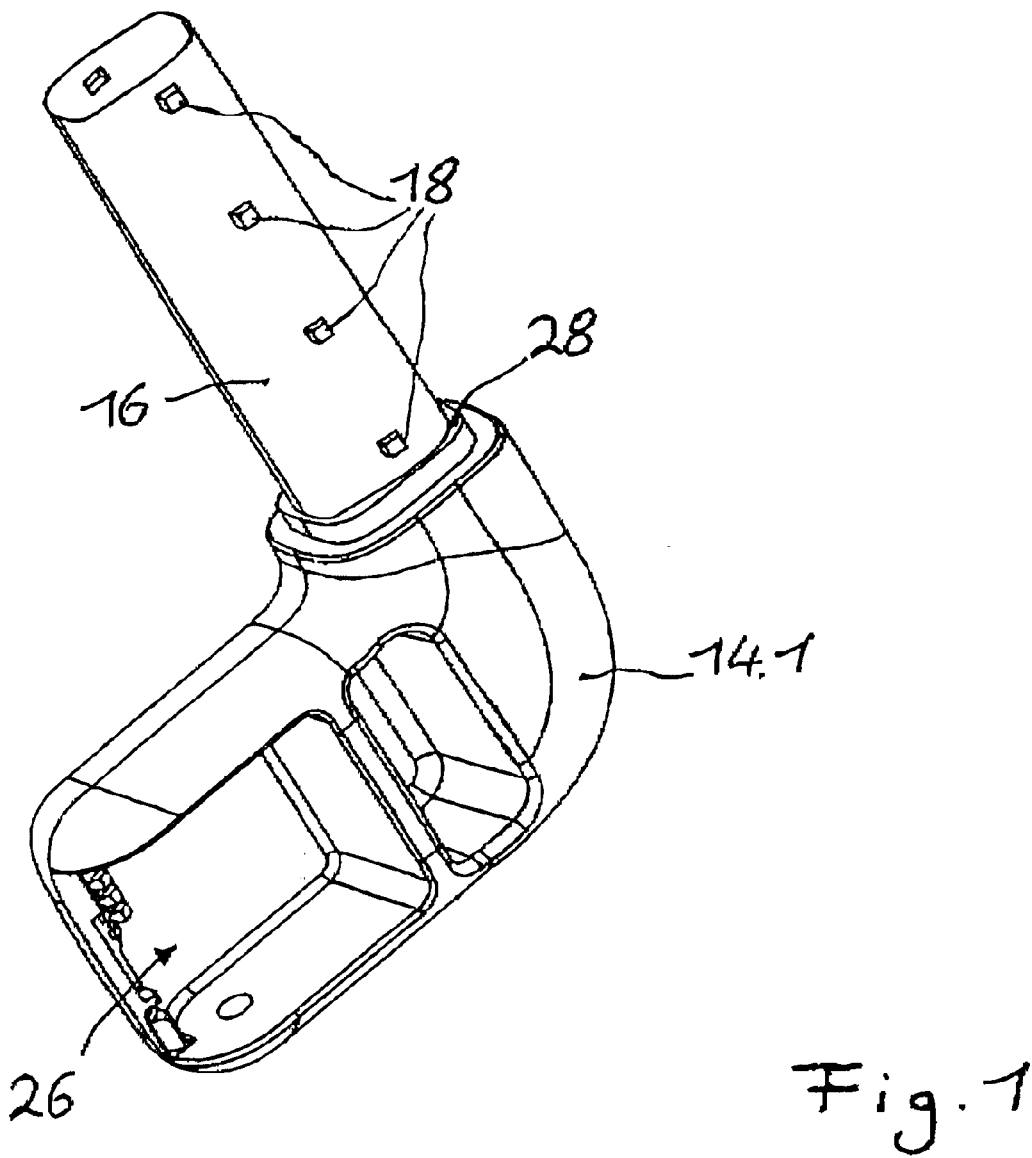
FIG. 1 shows a schematic perspective of an end part, with a projecting device, of a holding strap.

FIG. 1 schematically illustrates a right end part 14.1 in which the bent region can be seen clearly. In the right, lower region 28 there is the possibility of connection to a bearing structure (not illustrated in greater detail). Formed integrally in the other end region of the end part 14.1 is an essentially rectilinear projecting device 16 which has an outer contour enabling it to be plugged into the central part 12 in a certain position with respect to the inner contour thereof. The projecting device 16 is formed with a solid cross section. Located on the upper side and arranged in grid form are four first projecting units 18 which are formed integrally essentially in the shape of cuboids both on the upper side and on the lower side of the projecting device 16.

Figure 2A:
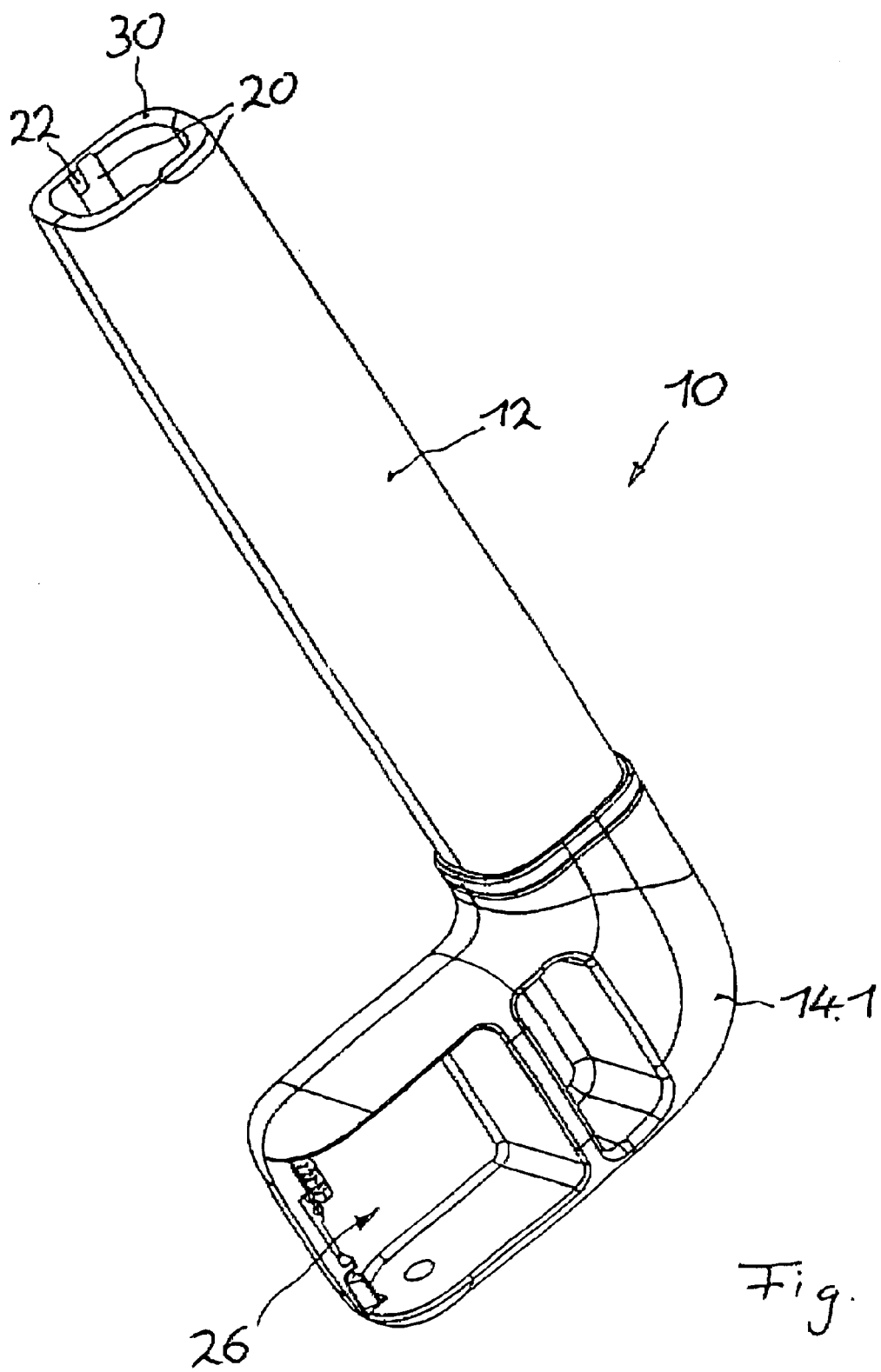
FIG. 2a shows a schematic detailed perspective of a holding strap with the central part and a plugged-in end part being illustrated.
Figure 2B:
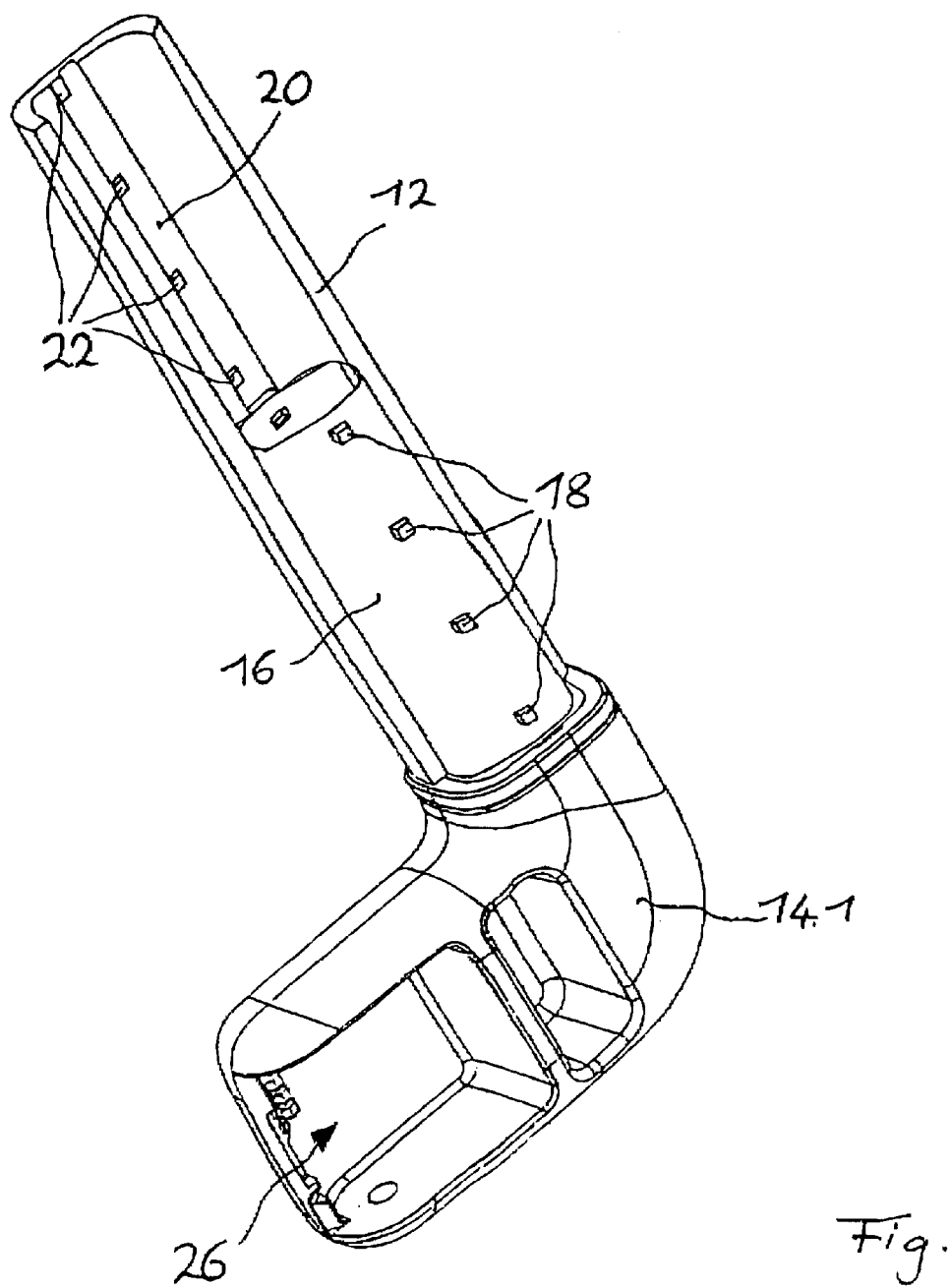
FIG. 2b shows a schematic detailed perspective of an opened-up central part with an end part plugged in on one side.

As can be seen in FIG. 2b, a groove 20 is molded into the inner wall of the central part 12 in the longitudinal direction, i.e. parallel to the longitudinal axis 24 of the central part 12, said groove having second projecting units 22 which spring into the groove 20, the second projecting units 22 springing just far enough into the groove 20 to enable the first projecting units 18 of the projecting device 16 still to be guided through between them and the groove wall. On the inner wall of the central part 12 there are a total of two diametrically opposite grooves 20 having second projecting units 22.

FIG. 2 shows the plugged-in end part 14.1 in the end position. The procedure for assembling the holding strap 10 is as follows. After the central part 12 has been formed by connecting the two half shells, first of all the right end part 14.1, for example, twisted about the longitudinal axis 24 through an angle W+, is fitted to the central part 12. In this position, the projecting device 16 of the end part 14.1 can be plugged into the interior of the central part 12. As this happens, the first projecting units 18 slide inward within the groove 20. As soon as a stop 28 present at the transition between the projecting device 16 and the remaining region of the end part 14 strikes against the end side 30 of the central part 12, the end part 14.1 can be twisted clockwise through the angle W+ so that the first projecting units 18 grip the second projecting units 22 from behind and are unable to be twisted further within the groove.

A corresponding procedure is followed during the plugging-in of the left end part 14.2 (FIG. 4) with the difference that the plug-in position is twisted counterclockwise, and when the stop 28 is reached, the right end part 14.1 is rotated counterclockwise through the angle of rotation W-. In this state, the left end part 14.2 is also secured against further twisting and against being pulled out, since the first projecting units 18 grip the second projecting units 22 from behind and strike against the wall of the groove 20.

The gripping of the projecting units 18 and 22 from behind means that the end parts 14.1 and, respectively, 14.2 are secured against being pulled out. At the same time, there is a reliable twist securing means, since when the central part 12 is rotated counterclockwise during use, the twist securing means grips on account of the right end part 14.1, and when the central part 12 is rotated counterclockwise during use, the twist securing means of the left and part 14.2 prevents further twisting.

Figure 3:
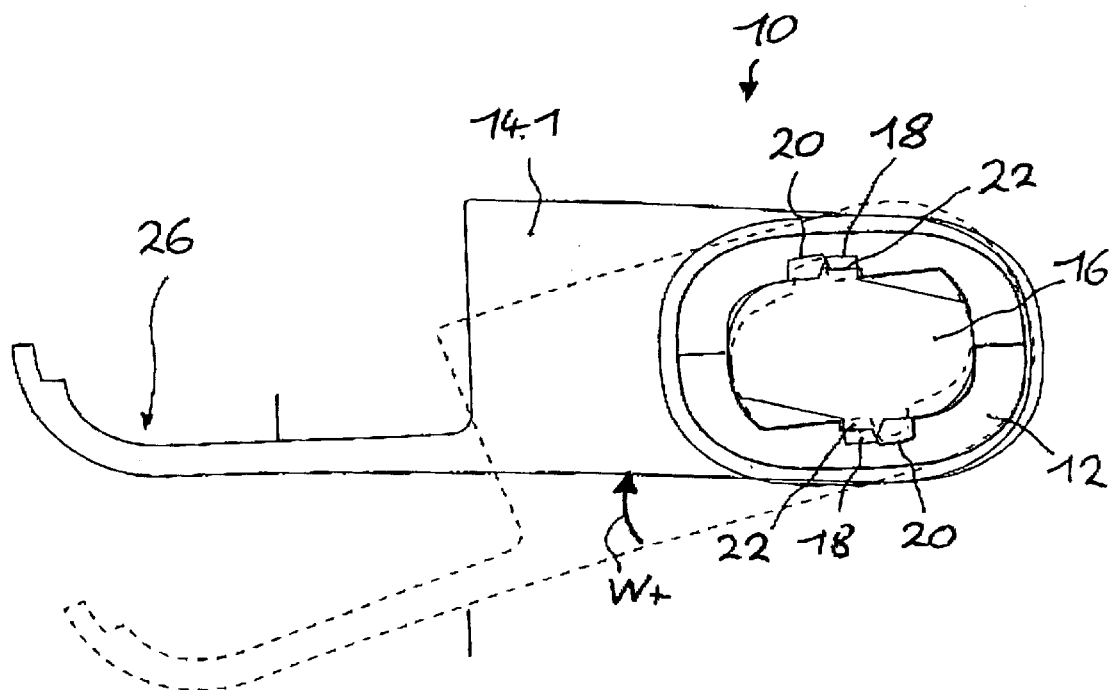
FIG. 3 shows a schematic sectional illustration through the holding strap of FIG. 2a in the installation position (dashed lines) and in the end position of the end part.
Figure 4:
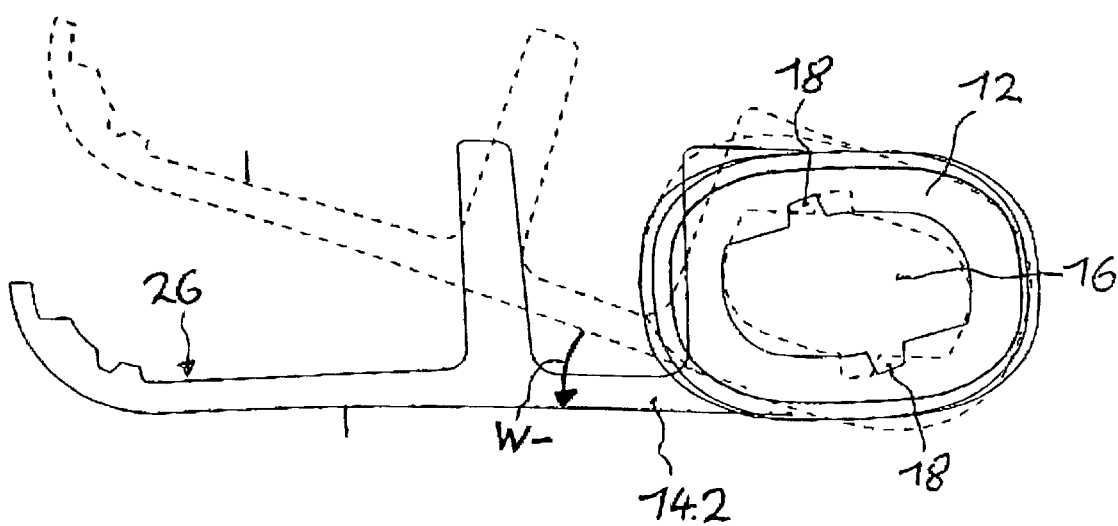
FIG. 4 shows a schematic sectional illustration of the holding strap in the region of the right end part in the installation position (dashed lines) and in the end position.
Figure 5:
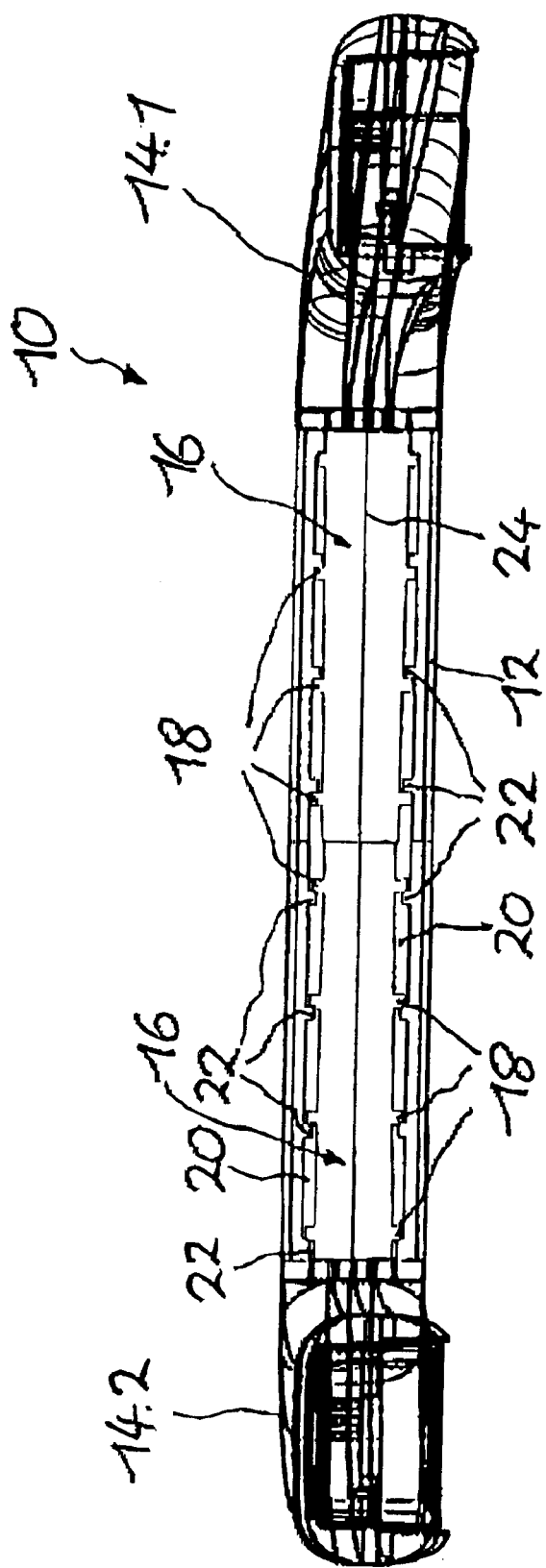
FIG. 5 shows a schematic and transparent plan view of a grab handle with the left and right end parts inserted.

In FIGS. 3 and 4, the plug-in position of the end parts 14.1 and, respectively, 14.2 is illustrated by dashed lines with respect to the end position.

All in all, it can be stated that the illustrated holding strap 10 for a grab handle can be produced in an extremely favorable manner from a central part 12 and end parts 14.1 and 14.2, which are formed as plastic injection-molded parts, and simple and rapid assembly is possible, it being possible to ensure a permanently reliable twist and plug-in securing means of the end parts 14.1, 14.2 with respect to the central part 12.

What is claimed is:

1. A grab handle for vehicle interiors, having a U-shaped holding strap (10) which has a tubular, essentially rectilinear central part (12) and two bent end parts (14.1, 14.2) each having a twist and plug-in securing means, the twist and plug-in securing means being plugged from opposite end sides of the central part (12) into the central part (12) and being held there, wherein
the twist and plug-in securing means comprises a projecting device (16) which is formed integrally on the respective end part (14.1, 14.2) and whose cross section is designed in such a manner that the projecting device (16) can be plugged into the interior of the central part (12) and a certain rotation with respect to the central part is possible about the longitudinal axis (24) of said central part,
at least one first projecting unit (18) is arranged on the outside of the projecting device (16),
for each end part there is molded on the inner wall of the central part (12) at least one groove (20) which runs in the longitudinal direction and in which the first projecting unit (18) engages during the plugging-in process of the end part (14.1, 14.2),
at least one second projecting unit (22) projects in each case into the groove (20),
in the plugged-in and twisted state of the end parts (14.1, 14.2) the first projecting unit (18) of the projecting device (16) gripping the second projecting unit (22) of the groove (20) from behind, and the gripping from behind in the case of the right end part (14.1) being produced by clockwise rotation W+ and in the case of the left end part (14.2) being produced by counterclockwise rotation W-, or vice versa, wherein the inner contour of the central part is non-circular and the outer contour of the projecting device is non-circular.

2. The grab handle as in claim 1,
wherein the groove (20) is designed as a continuous groove having at least two second projecting units (22).

3. The grab handle as in claim 1, wherein the first projecting unit (18) and the second projecting unit (22) are arranged in a predetermined, mutually coordinated grid on the projecting device (16) and, respectively, in the groove (20).

4. The grab handle as in claim 1,
wherein first projecting units (18) are arranged on opposite outer sides of the projecting device (16) and two diametrically opposite grooves (20) having second projecting units (22) are correspondingly arranged in the inner wall of the central part (12).

5. The grab handle as in claim 1,
wherein the central part (12) is formed by two half shells connected to each other.

6. The grab handle as in claim 1,
wherein the central part (12) and the end parts (14.1, 14.2) having the projecting device (16) are formed as injection-molded plastic parts.

7. The grab handle as in claim 1,
wherein the projecting device (16) is formed with a solid cross section.

8. The grab handle as in claim 1,
wherein the angle of rotation of the end parts (14.1, 14.2) to produce the gripping from behind of the first projecting units (18) by the second projecting units (22) lies in the range of between 20° and 30° (degrees).

9. The grab handle as in claim 1,
wherein the end parts (14.1, 14.2) have bearing sockets for the connection of bearing structures for the holding strap.

10. The grab handle as in claim 1,
wherein the holding strap is arranged in a foldable manner on a bearing structure.

11. The grab handle as in claim 1,
wherein the length of the projecting device (16) of an end part (14.1, 14.2) essentially corresponds to half the length of the central part (12).

* * * * *